Nov. 27, 1934. K. E. SKÄRBLOM 1,982,545
METHOD OF MAKING ETHYLENE GLYCOL
Filed July 11, 1933
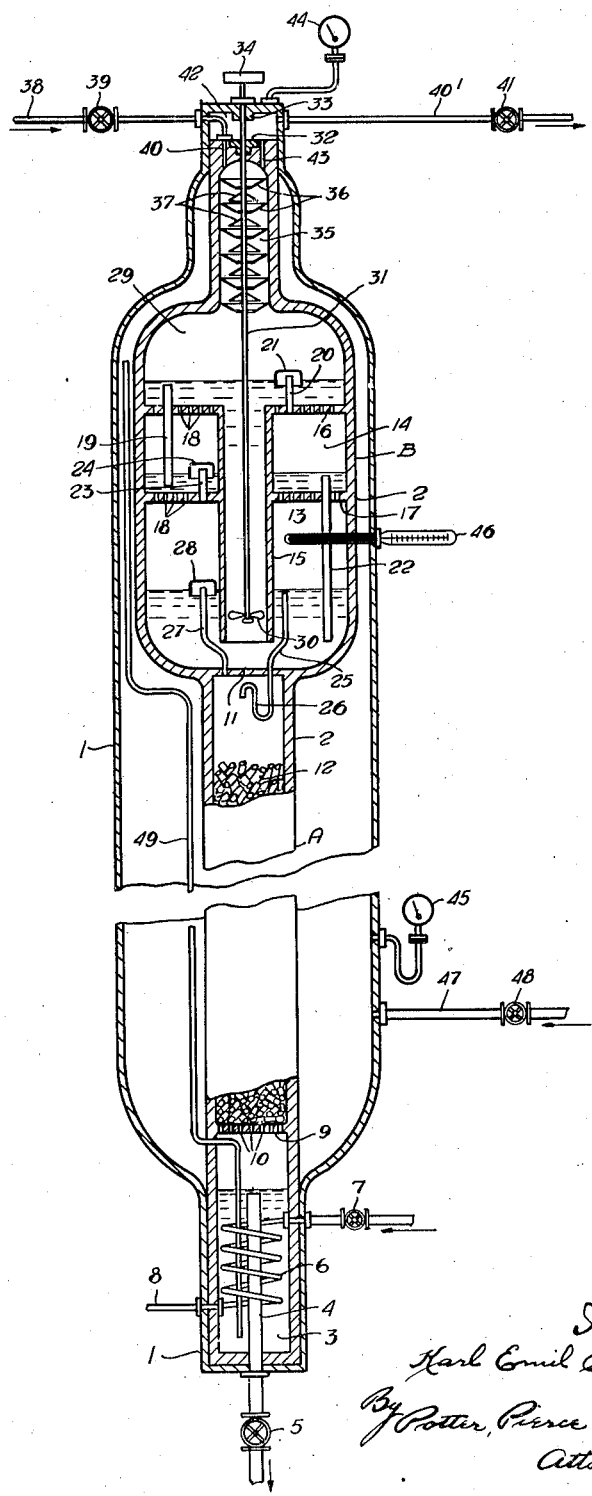
Inventor:
Karl Emil Skärblom,
By Potter, Pierce & Scheffler,
Attorneys.

Patented Nov. 27, 1934

1,982,545

UNITED STATES PATENT OFFICE 1,982,545

METHOD OF MAKING ETHYLENE GLYCOL

Karl Emil Skärblom, Lidingo, Sweden

Application July 11, 1933, Serial No. 679,976
In Sweden November 11, 1929

8 Claims. (Cl. 260—156.5)

This application is a continuation-in-part application with respect to application Serial No. 556,712, filed August 12, 1931, and, as to common subject matter, relates back to said application Serial No. 556,712 for all dates and rights incident to the filing thereof and the filing of foreign applications corresponding thereto.

This invention relates to the manufacture of ethylene glycol from ethylene, oxygen and water. Previously one did not know any process permitting of the continuous manufacture of glycol from the ordinary oxygen, ethylene and water. According to the present invention, however, the three substances may be easily combined to form ethylene glycol by contacting them with each other in the presence of iodine or a substance capable of readily liberating iodine. The process may be made continuous and theoretical yields are obtainable.

Glycol is at present prepared on a commercial scale by reacting chlorine or hypochlorous acid and ethylene, subsequently causing the ethylene chloride or chlorhydrine to give off chlorine by means of a chlorine acceptor in the presence of water and at elevated temperature, the main reaction taking place in such a manner that glycol is formed.

In this method, however, several by-reactions occur and a substantial portion of the ethylene and chlorine or hypochlorous acid is therefore lost for the formation of glycol. In addition the process is rather complicated and furnishes several worthless and detrimental by-products.

The object of the present invention is to provide an improved process in which these difficulties are obviated.

According to the present invention a process for the manufacture of ethylene glycol is characterized by reacting ethylene and oxygen or gas mixtures containing these gases with water in the presence of iodine or a substance capable of readily liberating iodine and then combining or linking with it again.

The present invention therefore avoids the difficulties referred to by employing as primary materials in the process, ethylene, oxygen and water.

In carrying out the invention, ethylene or oxygen (or air) in suitable proportions are introduced, either separately or together, into water containing iodine or an iodine compound in which the iodine is so loosely linked or combined that it is liberated either spontaneously or by the influence of oxygen or oxygen and water, to act upon the ethylene. Among such substances may be mentioned, for instance, iodide of hydrogen, ethylene iodide, potassium triiodide, ferric iodide, glycol iodinehydrine, etc.

The formation of the glycol may be represented as follows:

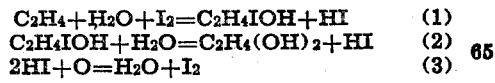

By adding the above equations one obtains $$C_2H_4 + O + H_2O = C_2H_4(OH)_2$$

From this it will be seen that the reaction mixture should preferably comprise two volumes of ethylene for each volume of oxygen. If chemically pure gases are used the composition of the gas mixture will thus be 66.7 per cent by volume of ethylene and 33.3 per cent by volume of oxygen. Accordingly, if air is used in the process instead of oxygen the composition of the gas mixture should preferably be 29.6 per cent by volume of ethylene, 14.8 per cent by volume of oxygen and the balance nitrogen. Obviously the composition of the gas mixture may be varied within broad limits so as to depart from the above-mentioned proportions, although the most economical results are obtained by proportioning the gas mixture in accordance with the reaction volumes of ethylene and oxygen.

In conformity with other catalytic processes the reaction velocity, which is of great importance in carrying out the method on a technical scale, also in this reaction depends upon the temperature applied and the concentrations of the reacting substances. The reaction proceeds at ordinary temperatures and pressures, but by elevating the temperature and gas pressure the reaction velocity is increased. In a preferred embodiment the reaction is allowed to take place in a closed vessel at a temperature above 50° C., the gas pressure being elevated to above atmospheric. It is obvious that such a process in which it is possible to vary the composition of the gas mixtures, the reaction temperature and pressure within broad limits permits of an indefinite number of embodiments or modes of operation which, however, all of them have that in common that they are based upon the action of the iodine.

The invention will now be described in detail with reference to the accompanying drawing which shows a section through an apparatus which can be used for carrying the invention into effect.

In the drawing 1 is an outer shell or mantle capable of withstanding the operating pressure and 2 is a vessel resistant to the action of iodine. There is no need for the vessel 2 to be capable of withstanding a high pressure as the pressure on the outside of the vessel 2 is only slightly higher than that within the same, and this vessel can therefore be made for example of porcelain, clay or enamelled acid resisting sheet iron. The vessel 2 consists of a lower part or distilling column, generally designated by A, and an upper part comprising the reaction chambers, generally designated by B. At the lower end of the column A is a chamber 3 for receiving liquid. 4 is an overflow pipe for removing liquid from chamber 3 and 5 is a valve for controlling this flow. 6 is a steam coil through which steam can be passed under pressure, entering through valve 7 and leaving at 8, for heating the liquid in chamber 3.

Above the chamber 3 is provided a bottom 9 with perforations 10 and the space above this bottom up to within a short distance of the partition wall 11 between the column A and the reaction chambers B is filled with a packing 12 of the well known kind for distributing a descending liquid and contacting it with a rising gas or vapor, for example broken porcelain. The column A is of considerable height and only part thereof is shown in the drawing.

The upper part B of the vessel 2 contains two reaction chambers 13 and 14. It is understood, however, that one reaction chamber or three or more may be used. The reaction chambers 13 14 are formed in conjunction with the wall of the vessel 2 by the tube 15 and the bottoms 16 and 17 which are provided with perforations 18. The bottom 16 is provided with an overflow 19 and a gas passage of the well known type comprising a tube 20 and a bell 21. The bottom 17 is also provided with an overflow 22 and a gas passage 23, 24. 25 is an overflow from the chamber 13 which at the lower end projecting through the partition wall 11 into the column A is bent upwards at 26 so as to form a liquid seal. 27, 28 is a gas passage into chamber 13 of the same type as above described.

Above the bottom 16 is a chamber 29, and for raising liquid from chamber 13 to chamber 29 there is provided in the tube 15 a propeller 30 carried by a shaft 31 journalled at 32 and 33 in the vessel 2 and the shell 1. The shaft extends through the shell 1 and the projecting end carries a pulley 34 for driving the shaft by suitable means not shown in the drawing.

At the top the chamber 29 is constricted to form a narrow chamber 35 serving as condenser. In this condenser chamber there are provided inclined plates 36 attached to the wall of the vessel 2 and inclined plates 37 attached to the shaft 31 so as to be rotatable with the latter.

38 is a pipe with valve 39 for supplying water through the aperture 40 in the vessel 2 to the condenser chamber 35. A gas outlet is provided by a pipe 40' with valve 41, which over the space 42 between the shell 1 and the vessel 2 and the vent 43 is connected with the condenser chamber 35.

44 is a pressure gauge in connection with the interior of the chamber 29 in the vessel 2, and 45 is a pressure gauge in connection with the space between the shell 1 and the vessel 2. 46 is a thermometer projecting into the reaction chamber 13 for measuring the temperature therein. 47 is a pipe with valve 48 for supplying a gas to the space between the shell 1 and the vessel 2, and 49 is a pipe for conducting this gas through a liquid seal formed in the chamber 3 into the vessel 2.

It is not necessary to provide the outer shell 1 as the vessel 2 can be used as it is, provided that it is strong enough to withstand the operating pressure. In this case the mixture of ethylene and oxygen can be introduced directly through the pipe 49 or in any other suitable way.

One method of using this apparatus for the making of ethylene glycol according to the invention will now be described in detail. It should be clearly understood, however, that the invention is not limited to this embodiment and that other modes of operation are possible.

In order to start the apparatus valve 41 is opened and pipe 40' connected with a vacuum pump and the apparatus evacuated. The apparatus is then after closing the valve 41 and disconnecting the vacuum pump filled through pipe 47 with a gas mixture consisting of 2/3 ethylene and 1/3 oxygen by volume, until a pressure in the apparatus of 1 kg/cm² is reached which is indicated by the pressure gauges 44 and 45. Valve 48 is then closed, valve 41 is again opened and water is introduced through valve 5 and overflow 4 until the chamber 3 is filled with water so as to cover the steam coil 6. The propeller 30 is then started and through pipe 38 is introduced a solution of iodine in diluted hydroiodic acid having a concentration of about 120 grammes of iodine per litre, said 120 grammes comprising the free iodine as well as the iodine of the hydroiodic acid. Care should be taken not to introduce more of the solution than is required to obtain a liquid layer in chambers 29, 14 and 13 but without liquid passing from chamber 13 into column A. The propeller 30 lifts the liquid from chamber 13 to chamber 29 from which it flows back to chamber 13 through the perforations 18 in the bottoms 16 and 17. The water in chamber 3 is now heated to boiling by passing steam through coil 6, for example having a temperature of 150° C., and when the vapor thus formed reaches the hydroiodic acid solution circulating through chambers 13, 14 and 29 this solution is heated to 100° C. When steam begins to escape through pipe 40' valve 41 is closed and the mixture of ethylene and oxygen is carefully introduced through valve 48, raising the pressure in the apparatus to the pressure of the mixture of ethylene and oxygen, for example a pressure of about 10 kg/cm². The gas introduced into the space between shell 1 and vessel 2 passes through pipe 49 and the liquid seal formed by the lower end of this pipe and the liquid in chamber 3 into the column A and from here through the reaction chambers through the gas passages provided for this purpose. In the vessel 2 the pressure will be slightly lower than in the space between shell 1 and vessel 2, but this pressure difference, which is determined by the effective height of the liquid seal in chamber 3, is only slight and the stress on vessel 2 is therefore negligible. The object of maintaining a slightly higher pressure in the space between shell 1 and vessel 2 than inside vessel 2 is to prevent leakage from vessel 2 in case this should not be absolutely tight. Thus if a leakage occurs in the wall of vessel 2 ethylene and oxygen may leak into vessel 2 but liquid or gas will not escape from this vessel into the shell 1.

The apparatus is now ready for continuous working. For this purpose valve 41 is slightly opened so as to permit a sufficient quantity of gas to escape to carry away the impurities in the gas mixture used, which otherwise would accumulate in the apparatus. By means of the steam coil 6 the rising vapor and the hydroiodic acid solution is heated more and more. When the thermometer 46 shows that the hydroiodic acid solution has reached a temperature of 110° C., cold water is carefully introduced through pipe 38 and the supply of steam to the steam coil 6 is regulated so as to maintain this temperature.

The cold water introduced through pipe 38 drops on to the plates 36 and 37 in the condenser chamber 35 and is distributed in this chamber in the form of a spray, the object being to condense any condensable vapors in the gases passing out through pipe 40 and thus prevent losses of the reaction vapors. From chamber 29 the liquid passes through the perforations 18 in the bottom 16 into chamber 14 in the form of a fine spray and mixes with the gas in this chamber, thus producing an intimate mixture of water, iodine, hydroiodic acid, oxygen and ethylene. Oxygen combines with hydroiodic acid to form iodine according to equation 3 referred to above, and iodine, water and ethylene combine to form glycol according to equations 1 and 2. In the like manner liquid passes from chamber 14 to chamber 13. From chamber 13 the liquid is raised again to chamber 29 by means of the propeller 30. In order to ensure proper circulation of the liquid through the reaction chambers as described it is preferable to arrange for the propeller 30 to raise more liquid to chamber 29 than can pass downwards through the holes 18. Accumulation of liquid on the bottoms 16 and 17 is prevented by the overflows 19 and 22 which thus act in the manner of safety devices.

As water is continuously introduced through pipe 38 a corresponding amount of liquid will also, when the system is in equilibrium, pass off from the reaction chambers through overflow 25 and seal 26. This liquid which contains hydroiodic acid, glycol iodinehydrine and ethylene glycol passes downwards through column A over the packing 12 in counter current to the steam rising from chamber 3 and the gases introduced through pipe 49. The glycol passes down into chamber 3 but the hydroiodic acid is decomposed by the oxygen in the rising gas mixture and the iodine thus liberated combines with the ethylene and water to glycol iodinehydrine, which together with the glycol iodinehydrine contained in the descending liquid is returned to the reaction chambers, as glycol iodinehydrine with water forms an azeotropic mixture which has a somewhat higher vapor pressure than the water. In this way only glycol which has a boiling point of 197° reaches the lower part of column A and is collected in the form of a 5–8 per cent solution of glycol in water in the chamber 3, from which it is run off by careful regulation of the valve 5. The glycol can then be concentrated in separate apparatus.

Instead of or together with the condenser arrangement 36, 37 a dry condenser may be used, i. e. a vessel, tube, coil or the like through which cooling water is passed. This dry condenser is then arranged in the chamber 35 or below this in the chamber 29. The object of such a dry condenser is to provide for a sufficient cooling of the vapors in the chamber 35 or 29 without the necessity of supplying a large quantity of water from pipe 38, in case of irregular operation of the apparatus, which would unnecessarily dilute the glycol solution ultimately obtained in chamber 3.

Although the process works at a reaction temperature of 50° C. the temperature should preferably be kept higher so as to obtain a practical velocity of reaction. In the above example I have selected a reaction temperature of 110° C. although I may equally well take 100° C. or 120° C. Experiments where the temperature was as high as 160° C. and more worked well and the yield was good, although the glycol solutions obtained had a slight tendency to become discoloured. Experience shows that the reaction temperature should preferably be kept within the limits 90 and 130° C. so as to obtain a practicable reaction velocity and to avoid discolouring of the glycol.

Also the pressure may be varied. The upper limit of pressure is only set by the resistance of the apparatus. One may for instance work with a pressure of 5 kg/cm² on the gas mixture, and the preferred range of pressure is from 5 to 20 kg/cm². Independent of the choice of operating temperature care should be taken that the pressure of the gas mixture is in excess of the vapor pressure of the reaction solution, preferably by an amount of at least 2 kg/cm².

As is stated above, temperatures and pressures are not critical and the optimum temperatures and pressures are determined by factors which have nothing to do with the invention; that is to say, they are determined by the economic balance between the increased velocity obtained at higher temperatures and pressures and the increased cost of apparatus which will stand high temperatures and pressures.

To prevent a possible generation of by-products due to the formation of hydrogen iodide, the reaction may be carried out in the presence of an oxidation catalyst, such as a ferric salt, a manganese salt or the like. Thus in the example given above there may be added to the cold water, before it is admitted into the column, a quantity of up to 5 g. of $Fe_2(SO_4)_3$ to the litre.

What I claim is:—

1. Process for making ethylene glycol which comprises bringing into contact ethylene, oxygen, and water in the presence of iodine at a temperature above 50° C. and at a superatmospheric pressure.

2. Process for making ethylene glycol which comprises bringing into contact ethylene, oxygen, and water in the presence of a substance capable of readily liberating iodine under the conditions of the reaction, at a temperature above 50° C. and at a superatmospheric pressure.

3. Process for making ethylene glycol which comprises bringing into contact ethylene, oxygen, and water in the presence of iodine and a catalyst for the reoxidation of hydrogen iodide, at a temperature above 50° C. and at a superatmospheric pressure.

4. Process for making ethylene glycol which comprises bringing into contact ethylene, oxygen, and water in the presence of a substance capable of readily liberating iodine under the conditions of the reaction, and a catalyst for the reoxidation of hydrogen iodide, at a temperature above 50° C. and at a superatmospheric pressure.

5. Process as defined in claim 1 in which the temperature employed is from 90–130° C. and the pressure from 5–20 kg/cm².

6. Process as defined in claim 2 in which the temperature employed is from 90–130° C. and the pressure from 5–20 kg/cm².

7. Process as defined in claim 3 in which the temperature employed is from 90–130° C. and the pressure from 5–20 kg/cm².

8. Process as defined in claim 4 in which the temperature employed is from 90–130° C. and the pressure from 5–20 kg/cm².

KARL EMIL SKÄRBLOM.